Nov. 25, 1924.
C. B. JOHNSON
SHOULDER OPERATED VEHICLE
Filed Nov. 16, 1920
1,516,856
3 Sheets-Sheet 1
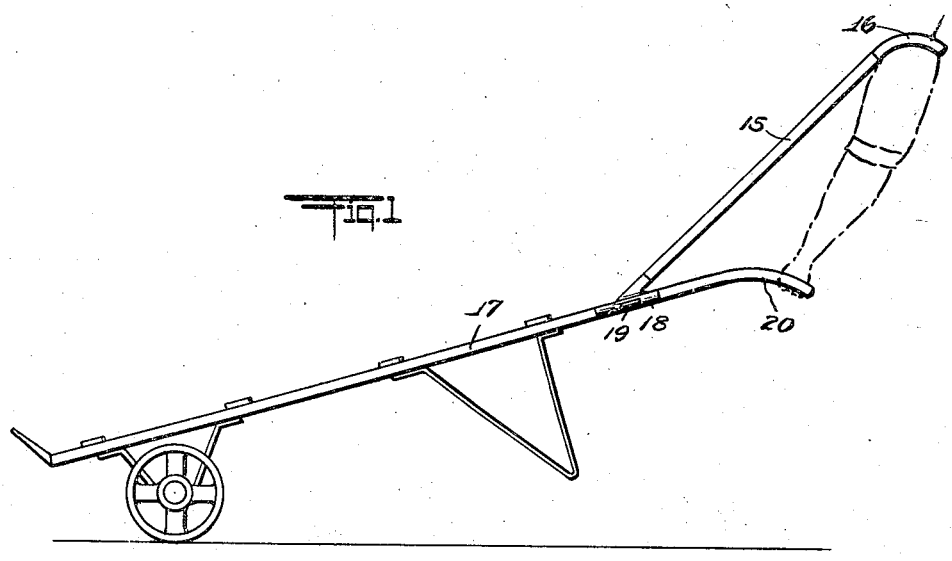
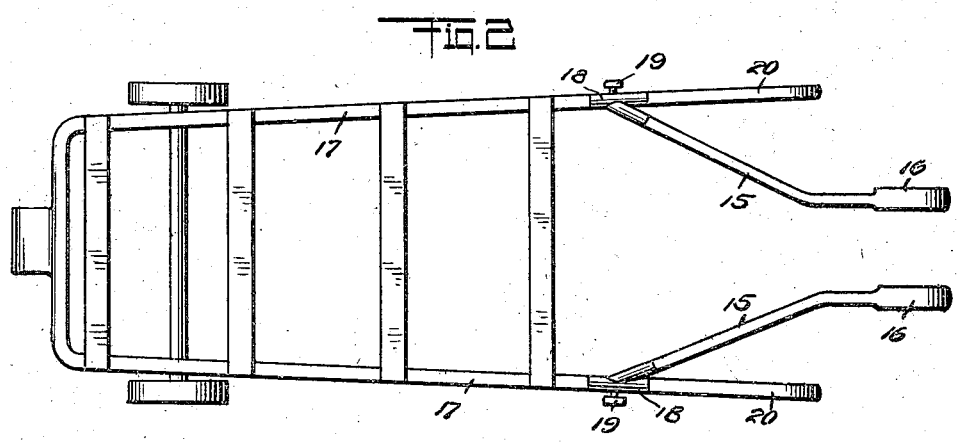
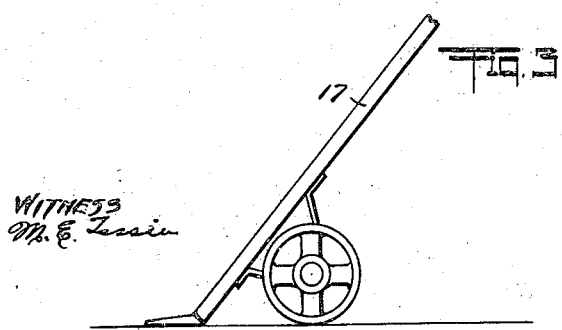
INVENTOR
C. B. Johnson Nov. 25, 1924.
C. B. JOHNSON
SHOULDER OPERATED VEHICLE
Filed Nov. 16, 1920
3 Sheets-Sheet 2
1,516,856
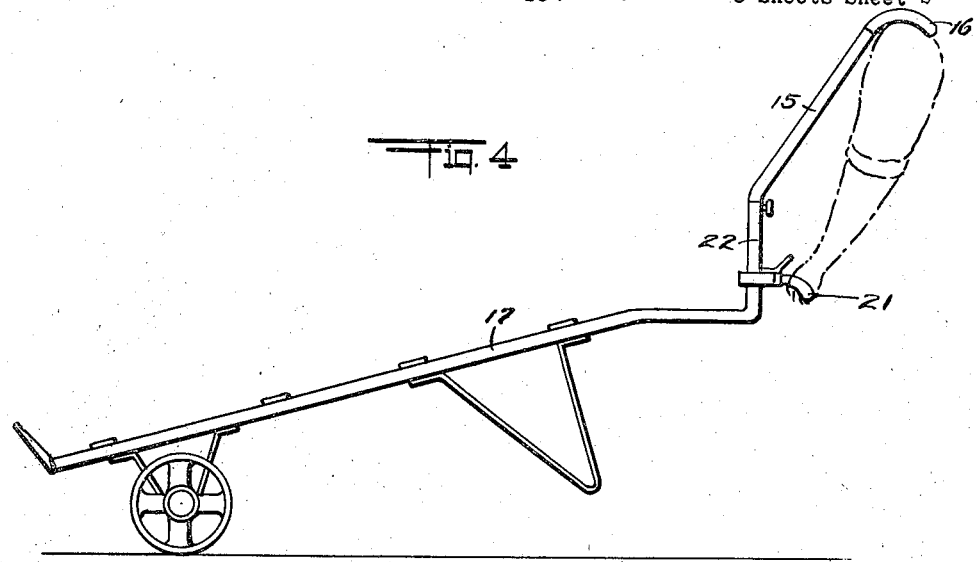
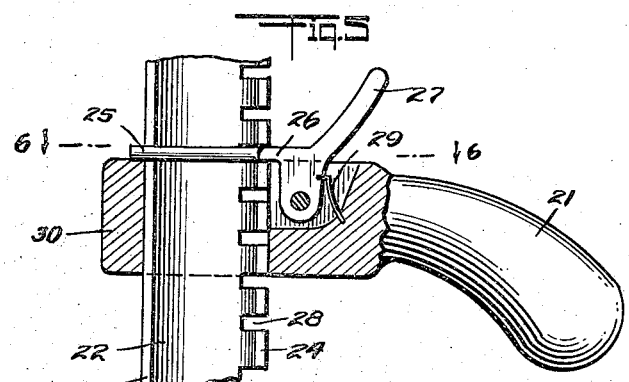
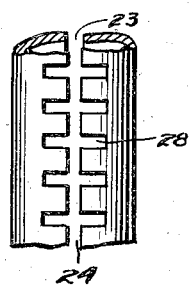
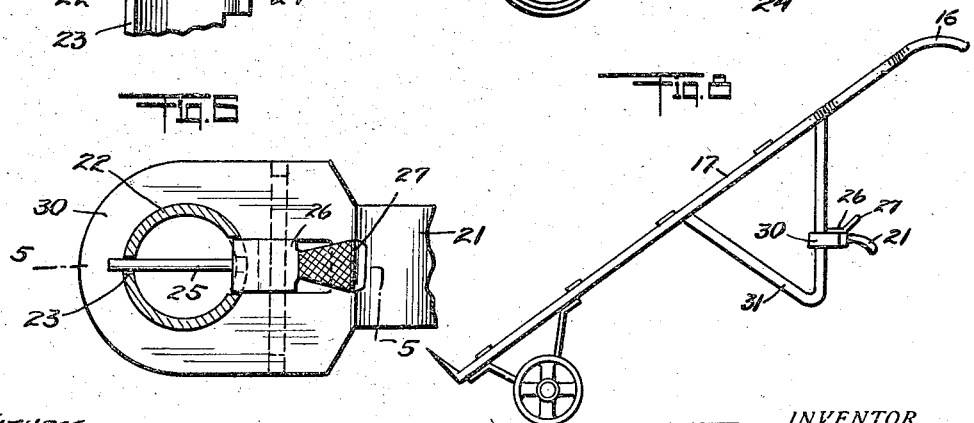
WITNESS
M. E. Lessin
INVENTOR
C. B. Johnson
BY
ATTORNEY

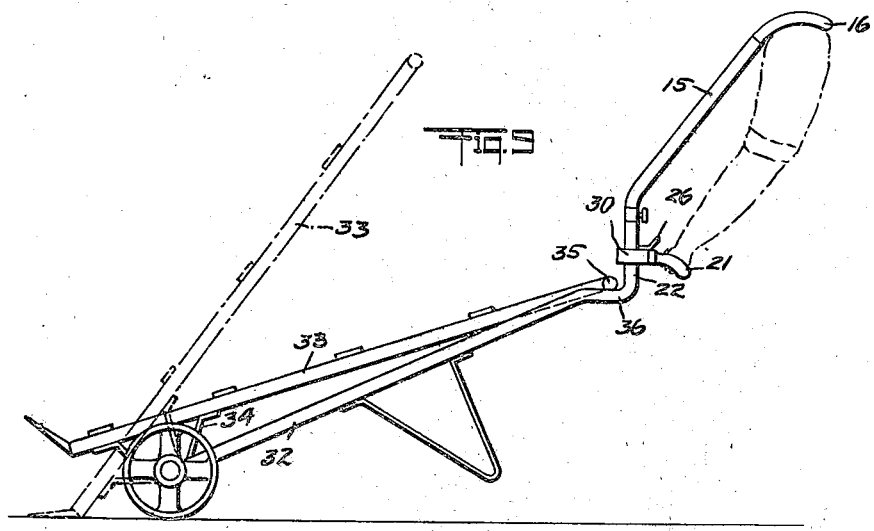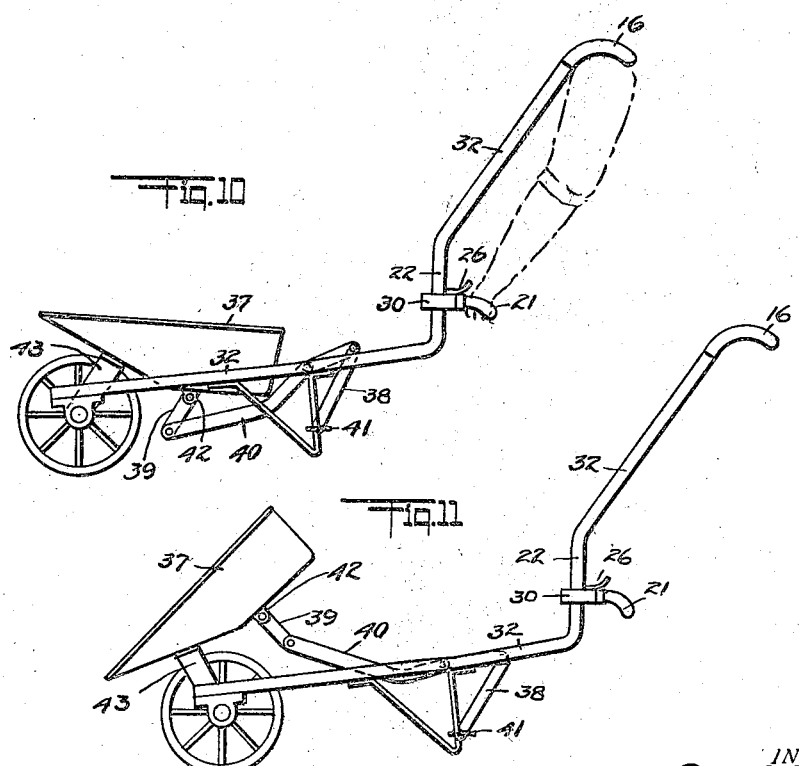

Patented Nov. 25, 1924.

1,516,856

UNITED STATES PATENT OFFICE.

CHARLES B. JOHNSON, OF BROOKLYN, NEW YORK.

SHOULDER-OPERATED VEHICLE.

Application filed November 16, 1920. Serial No. 424,359.

*To all whom it may concern:*

Be it known that I, CHARLES B. JOHNSON, a citizen of the United States, and a resident of the city of New York, borough of Brooklyn, county of Kings, State of New York, have invented certain new and useful Improvements in Shoulder-Operated Vehicles, of which the following is a full, clear, and exact description.

Among the principal objects which the present invention has in view are: To employ the body directly for supporting and propelling vehicles particularly of the trundling type; to relieve the carrying strain from the hands and arms of the person operating the vehicle; to employ the hands and arms of the person for guiding and assisting in the manipulation and handling of the vehicle; and to adjust the parts of the vehicle to accommodate the shoulders and arms of the person manipulating the same.

*Drawings.*

Figure 1 is a side view of a freight truck constructed and arranged in accordance with the present invention;

Figure 2 is a top plan view thereof;

Figure 3 is a detail view showing a fragment of the truck in loading and unloading position;

Figure 4 is a side view of a similar truck having adjustable hand grips provided thereon;

Figure 5 is a detail view on enlarged scale, partly in section, showing said hand grips, the section being taken as on the line 5—5 in Figure 6;

Figure 6 is a section taken as on the line 6—6 in Figure 5;

Figure 7 is a detail view showing a fragment of the side bar of the truck with which the hand grips are engaged;

Figure 8 is a side view on diminished scale showing a modified form of the truck disclosed in Figure 4;

Figure 9 is a side view of a truck constructed and arranged with the further modification of the invention;

Figures 10 and 11 are side views of the construction in the form of a wheelbarrow having an improved method of dumping the same.

*Description.*

The present invention is particularly adapted for employment in manually operated implements where the load is partially carried by the person manipulating or guiding the vehicle. The class of vehicles includes such types as freight trucks, wheelbarrows, pushcarts, lawn mowers, certain agricultural implements, garden tools, in fact all wheel carried implements or vehicles in which the wheels are designed to carry a portion only of the load. Heretofore vehicles or implements of this type have been supported by the operator who has used his hands for lifting as well as for pushing or propelling the vehicle. In some instances devices have been provided for transferring all or a portion of the weight of the vehicle to the shoulder of the operator using for that purpose some form of shoulder strap or as shown in the patent granted August 12, 1919, No. 1,312,990, to the present applicant, an auxiliary swinging frame having a shoulder seat or resting member. These devices have resembled in character the luggage carriers of porters, and differ from the present invention in that the handling of the vehicle or implement has been mainly, if not altogether, dependent upon the arms or the hands of the operator.

In the present invention the side bars of the vehicle are permanently provided with a shoulder extension 15 at the extremity of which is formed an appropriately shaped yoke 16. In the preferred form of the invention the extension 15 is secured to the side bar 17 of the vehicle or truck by means of a sleeve 18 which permits the yokes 16 to be swung into closer or wider juxtaposition. The purpose of this adjustment is to accommodate differences in breadth of shoulder of the operators.

The adjustment is effected by using a set screw 19, which extends through each of the sleeves 18. By setting up the screws 19, it is obvious that the adjusted position of the yokes 16 may be maintained. When the implement is a truck, such as shown in Figures 1 to 3 inclusive, the sleeves 18 are adjusted to the hand bars 20, which are grasped by the operator for the purpose of assisting in the manipulation of the vehicle or for steadying it in its operation.

When a truck such as shown in Figures 1 to 3, inclusive, is constructed and arranged in accordance with the present invention as above described, it is operated to all intents and purposes as is the ordinary or usual truck of the present time, except that the weight of the vehicle or implement and load carried thereon is borne almost exclusively on the shoulders of the operator, and further, the forward thrust of the vehicle or implement is imparted by the shoulders, the hands of the operator being only employed to assist in guiding the implement or in steadying the operation thereof. The method of adjusting the extensions 15 and the yokes 16 is quickly effected in the manner as set forth above. In dumping the truck or placing it in the position shown in Figure 3 of the drawings, the hand of the operator may be called upon to perform a more important portion of the operation.

It is obvious that many modifications of the construction may be devised. A few have been shown in the drawings Figures 4 to 11, inclusive. Of these modifications that shown in Figures 4 to 7 is useful where trucks or similar implements are used by different persons and where it is desired to change the situation of the hand grips 21. This is occasioned by reason of the fact that different operators have different lengths of arms.

To facilitate the adjustment of the hand grips 21 with reference to the yokes 16, the side bars 17 are provided with a vertical extension 22, where they join the extensions 15. The extensions 22, as seen best in Figures 5 to 7 inclusive, are provided with vertical slots 23 and 24. The slots 23 are of constant width to guide the end of the rod 25 on the trigger 26. As seen best in Figure 6, the trigger 26 has a flattened body between the rod 25 and the thumb piece 27, which body is adapted to enter and rest in the various lateral openings 28 with which the extension 22 is provided and which leads out of the slot 24. The trigger 26 is held in engagement with the openings 28 by a spring 29.

The hand grips 21 have each a collar 30 which, as seen best in Figure 6, surrounds in sliding relation the extensions 22. It is obvious that when thus arranged, the operator on lifting the truck by placing thereunder his shoulders engaging the yokes 16, the hand grips 21 may be quickly adjusted to suit his length of arm by drawing back the trigger 26 and moving the grips 21 to the desired position on the extensions 22 before releasing the triggers 26, when the flat portions thereof enter the openings 28 at the new or adjusted position.

In Figure 8 is shown a modified form of the implement seen in Figure 4. The modification consists in providing the truck leg 31 and the portion thereof adjacent the yokes 16 with the grooves 22, 24 and openings 28, which accommodate the hand grips 21 and trigger 26 thereof.

In Figure 9 of the drawings is shown a modification of the invention using the frame substantially as shown in Figure 4 having side bars 32 attached directly to the axle of the carrying wheels, while a truck frame 33 is pivotally mounted by brackets 34 on the axle of said wheels. The free end of the truck frame 33 has a hand bar 35 which rests on crooks 36 formed in the side bars 32.

As indicated by broken lines in Figure 9 the truck frame 33 may be upturned to what is known as the dumping or loading position, while the carrying frame is maintained in the operating position at rest on the shoulders of the operator.

In Figures 10 and 11 is shown the modification of the invention as adapted to the wheelbarrow constructions, or constructions wherein a single guiding carrying wheel is employed. To avoid the necessity of removing the yokes 16 from the shoulders of the operator to dump the wheelbarrow bodies 37, I provide a series of links 38, 39, and a rocking lever 40, which connects the said links. The extreme end of the link 38 is attached to a foot bar 41, which may be depressed by the foot of the operator while holding the frame in operating position. The extreme end of the link 39 is attached pivotally to the bracket 42 at the bottom of the body 37. The body 37 is pivotally mounted on the axle of the wheelbarrow by means of a bracket 43. The operation of depressing the bar 41 results in moving the body from the position shown in Figure 10 to the position shown in Figure 11.

As indicated above, many modifications of the structure of the carrying implements may be employed in conjunction with the present invention. It is also obvious that by reversing the yoke 16 so that the hollow thereof is upturned, the extensions 15 of which they form a part, may be adapted to implements such as walking plows cultivators and other implements where the weight of the body could be rested on the implement by means of the shoulders instead of the hands and arms as is at present the custom.

*Claim.*

A vehicle having mechanical means for partially supporting a load carried thereon; a rigid frame connected with said means for receiving a shoulder thrust imposed by the operator of said vehicle for moving said vehicle; and adjustable hand gripping means provided on said frame to accommodate variations in length and disposition of the arms of different operators.

CHARLES B. JOHNSON.